United States Patent [19]

Heideman

[11] Patent Number: 5,050,712
[45] Date of Patent: Sep. 24, 1991

[54] SHOCK ABSORBER

[75] Inventor: Robert J. Heideman, Westland, Mich.

[73] Assignee: Enertrols, Inc., Westland, Mich.

[21] Appl. No.: 342,912

[22] Filed: Apr. 25, 1989

[51] Int. Cl.⁵ .............................. F16F 9/48; F16F 9/34
[52] U.S. Cl. .................................. 188/287; 188/315; 188/322.19
[58] Field of Search ............... 188/285, 287, 315, 318, 188/322.19

[56] References Cited

U.S. PATENT DOCUMENTS

| 2,944,639 | 7/1960 | Blake | 188/287 X |
| 3,110,367 | 11/1963 | Roberts | 188/287 |
| 3,363,729 | 1/1968 | Rumsey | 188/315 |
| 3,731,770 | 5/1973 | Bindon | 188/287 X |
| 3,782,710 | 1/1974 | Selke et al. | 188/287 X |
| 3,874,485 | 4/1975 | Smith | 188/315 X |
| 4,174,098 | 11/1979 | Baker et al. | 188/285 X |
| 4,321,987 | 3/1982 | Dressell, Jr. et al. | 188/285 |
| 4,482,035 | 11/1984 | Heidman et al. | 188/318 X |
| 4,588,171 | 5/1986 | Stephens | 188/318 X |
| 4,838,392 | 6/1989 | Miller et al. | 188/315 X |

FOREIGN PATENT DOCUMENTS 1362164  4/1964  France .................. 188/318

Primary Examiner—George E. A. Halvosa
Attorney, Agent, or Firm—Dykema Gossett

[57] ABSTRACT

A shock-absorbing device (10) includes an inner cylinder (22) surournded by an outer tube (12) whose ends are enclosed by end caps (14, 128). A piston (42) within the cylinder (22) forces hydraulic fluid through holes (106-116). A metering sleeve (130) slidable over the cylinder (22) includes cross-cut openings (132-142) therein defining rectangularly-shaped metering orifices which selectively close off the openings (106-116) in the cylinder (22) to adjust the flow of hydraulic fluid, and thereby alter the shock-absorbing characteristics of the device. The cross-cut openings (132-142) may be formed by passing a cutting element along a straight stroke through a side of the metering sleeve (130) at a depth sufficient to create an orifice in the inner wall of the sleeve (130).

16 Claims, 3 Drawing Sheets

SHOCK ABSORBER

TECHNICAL FIELD

The present invention generally relates to shock absorber devices for linearly decelerating a machine part by imposing a relatively constant force to the part over the stroke of the device, and deals more particularly with a device of the type wherein the constant decelerating force may be adjusted for use with machine parts having differing weights and velocities.

BACKGROUND ART

Shock absorbers which force fluid through a restricted orifice to convert the kinetic energy of a moving part into an increase in the thermal energy of the fluid are commonly used on various types of machines and are therefore well known in the art. The smoothest deceleration of the moving part is obtained by absorbers which offer a constant resistive force to the motion over the total length of the deceleration.

One type of such devices employs a piston connected to the machine part and movable within a cylinder having a closed end. A series of exponentially spaced holes are formed along the length of the cylinder wall, and the cylinder is supported within a housing filled with fluid. As the piston is forced into the cylinder by the motion of the machine part, the fluid forced through the holes and the kinetic energy of the part is converted into thermal energy of the fluid. As the piston moves down the cylinder, it successively closes off the holes so that the force imposed on the load is maintained relatively constant, resulting in a linear deceleration of the moving part.

The force imposed on the part is a function of the configuration of the fluid orifice and linear decelerators of this type have been designed wherein the orifice configuration may be varied to accommodate the device for use with parts having varying weights and kinetic energy. One common approach is to provide grooves in a tubular sleeve fitting over the cylinder. The grooves in the sleeve cooperate with holes in the cylinder to define the fluid orifices. The angular or axial position of the sleeve on the cylinder may be adjusted to vary the orifice configuration and thus the resistance provided to the load. Representative examples of so-called "groove-on-hole" shock absorbers are disclosed in commonly assigned U.S. Pat. Nos. 4,059,175, 4,298,101, and 4,321,987, as well as U.S. Pat. No. 3,425,522 to Gryglas and U.S. Pat. No. 3,693,767 to Johnson. More recently, an improved groove-on-hole design has been devised as disclosed in U.S. Pat. No. 4,702,355 assigned to the assignee of the present invention, which advantageously employs a semicircular groove to create substantially turbulent flow at the metering orifice. Finally, also of some interest is U.S. Pat. No. 4,482,035, likewise assigned to the assignee of the present invention, which discloses a hole-on-hole type of cylinder and sleeve arrangement.

In connection with the prior art shock absorber designs described above, the ends of the outer tube of the shock absorber were closed by means of end walls or caps secured in place by snap rings. It was discovered that such snap rings allowed slight circumferential movement of the inner tube or cylinder relative to the metering sleeve, thus creating improper alignment of the holes in the cylinder relative to the holes in the metering sleeve. In order to solve this problem, grooves were formed in the inside surface of the metering tube, each of such grooves being provided with an exhaust hole somewhere along its length, thus creating the "groove-on-hole" arrangement described above. The groove-on-hole arrangement is less than completely desirable, in part because of the sheer expense of forming a plurality of properly configured and dimensioned grooves in the inside surface of the metering sleeve. Also, such an arrangement, because of its geometric configuration, resulted in some degree of erosion of those portions of the sleeve/cylinder against which the hydraulic fluid flows, as it passes from an area of high pressure, through the metering holes, into an area of low pressure. The erosion problem was, of course, much more severe in those applications in which the shock-absorbing device was required to absorb the force of relatively large loads over a large number of repetitions.

The use of snap rings to mount the end walls of the outer cylindrical tube, in addition to permitting undesired rotation of the inner tube, sharply limited the rating or capacity of the shock-absorbing device, since they were effectively the "weak link" in the shock-absorbing mechanism when operating under heavy loads. The high forces generated by the machine element bearing on the piston and cylinder result in fluid pressures that are sufficiently high to overcome the restraining force of the snap rings, and thus blow out one of the end walls.

The present invention is directed to overcoming each of the deficiencies mentioned above.

SUMMARY OF THE INVENTION

According to one aspect of the invention, a shock-absorbing device is provided of the type employing hydraulic fluid for absorbing the kinetic energy of a moving member so as to decelerate the member, which includes a tubular cylinder having a plurality of longitudinally spaced holes therein, a piston slidable within the cylinder, a sleeve slidably surrounding the cylinder and provided with a plurality of cross-cut openings or grooves therein which communicate with the holes in the cylinder, and means for sliding the tubular cylinder both longitudinally and circumferentially so as to adjust the registration of the holes with the cross-cut metering openings. The metering openings each extend through only a portion of the side wall of the sleeve and define an essentially rectangularly-shaped metering orifice in the interior wall of the sleeve. The metering openings are preferably defined by a pair of parallel, spaced-apart side walls, and first and second flat bottom walls having the rectangular aperture defined therebetween.

According to another aspect of the invention, a novel method of forming fluid metering orifice in the cylindrical sleeve is provided, which comprises the step of forming longitudinally spaced-apart cross-cuts in one side of the sleeve, each of these cross-cuts being at a depth sufficient to define an orifice through the sleeve. The cross-cuts are preferably formed by successively passing a cutting member, such as a milling head, through one side of the sleeve in straight strokes.

In accordance with a still further aspect of the invention, a shock-absorbing device is provided of the general type described above in which the ends of the outer tube are closed by means of a pair of end caps, a pair of retaining members respectively bearing against the opposite end faces of the outer tube and overlying the end caps, and threaded fastening means extending longitudinally through the retaining members into the outer tube. The threaded fastening means preferably includes a plurality of threaded, elongate fastening members, such as bolts which extend into areas of increased radial thickness of the outer tube for receiving these members. The retainer members each preferably comprise a ring.

The cross-cut groove openings substantially reduce manufacturing costs, compared to prior art groove-on-hole configurations, since the cross-cut openings may be simply manufactured; yet the advantages of a groove arrangement are retained, i.e. assured registration of openings in the metering sleeve with those of the inner tube. In addition, the cross-cut openings of the present invention eliminate problems of material erosion since the fluid is not required to flow through long grooves, but rather exhibits the low erosion characteristics of a hole-on-hole arrangement in which the hydraulic fluid flows substantially in a straight line of sight through the openings from the high-pressure area to the low-pressure area.

The end wall retaining arrangement possesses the advantage of applying a higher retaining force to the end caps of the device, thus allowing a device of given dimensions to be used in higher loading applications compared to the prior art. In addition, the end caps retaining arrangement eliminates the possibility of undesired rotation of the inner tube, thus eliminating the possibility of improper registration between the metering openings and holes and attendant improper metering.

These and further features and advantages of the invention will be made clear or will become apparent during the course of the following description of a preferred embodiment of the present invention.

BRIEF DESCRIPTION OF THE DRAWINGS

In the drawings, which form an integral part of the specification and are to be read in conjunction therewith, and in which like reference numerals are employed to designate identical parts in the various views.

DETAILED DESCRIPTION OF THE PREFERRED EMBODIMENT

Figure 1:
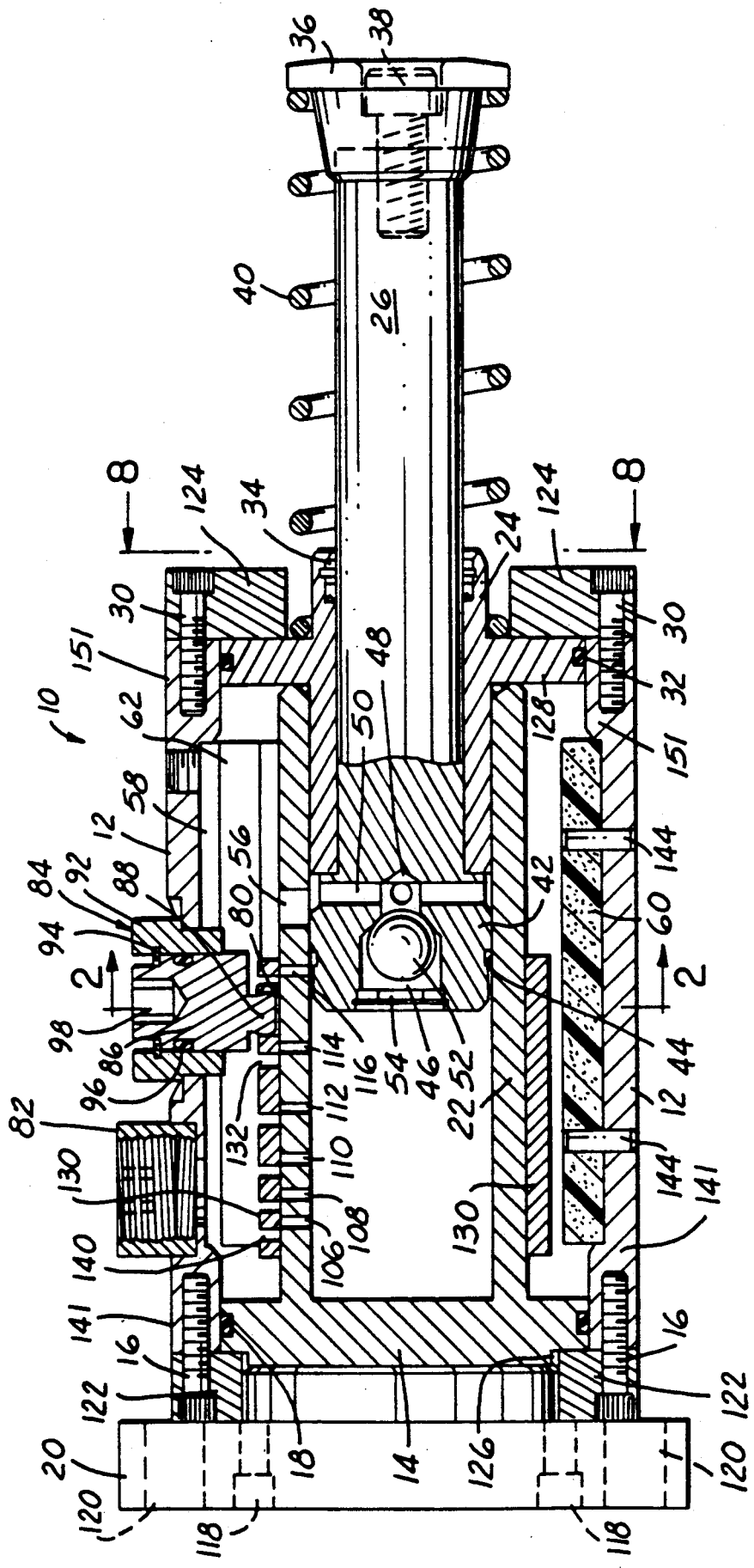
FIG. 1 is a longitudinal view of an improved shock absorber according to the present invention, parts being broken away in section for clarity.

Referring now to the drawings, the shock absorber 10 of the present invention includes a main, cylindrical outer tube 12. One end of tube 12, hereinafter called the rear end, is closed off by an end wall or cap 14 secured within the inner wall of the tube 12 by a ring-shaped retainer 122 and threaded fastening means in the nature of a plurality of cap screws 16. The end cap 14 is provided with a circumferentially extending notch 126 that defines a shoulder against which one face of the retainer 122 may bear. The cap screws 16 are circumferentially spaced around and extend through the retainer 122. The threaded ends of the cap screws 16 extend longitudinally into a section 141 of the tube 12 which possesses an increased radial thickness relative to the remaining portions of the tube 12. The retainer 122 thus radially overlaps the end cap 14 and imposes a force on the end cap 14 in a longitudinal direction toward the front end of the tube 12.

The end cap 14 is provided with an O-ring 18 to form a fluid seal between the end cap 14 and the inner wall of the tube 12. A radially extending flange 20 is secured to the rear end of the tube 12 by means of circumferentially spaced screws 118. The flange 20 forms a mounting plate provided with openings 120 therein to allow mounting of the shock absorber to a suitable supporting surface.

A tubular metering cylinder 22 is secured to, or alternatively, may be formed integral with (as depicted in FIG. 1), the end cap 14, and projects forwardly through the tube 12. The outer diameter of cylinder 22 is substantially smaller than the inner diameter of tube 12 so as to form an annular volume therebetween. The forward inner wall of cylinder 22 engages a cylindrical sleeve bearing 24 adapted to slidingly support an elongated piston rod 26 that projects out of the forward end of the assembly. The bearing 24 is secured to, or alternatively, is formed integral with (as depicted in FIG. 1), a ring-shaped front cap 128. The front cap 128 is provided with an O-ring 32 to form a fluid-tight seal between the inner surface of the tube 12 and the assembly formed by the front end cap 128 and bearing 24. The inner face of the front end cap 128 bears against the forward end of the cylinder 22, and is held in place by means of a ring-shaped forward retainer 124. The retainer 124 overlies both the front end of the outer tube 12 and a substantial portion of the outer face of the front end cap 128. The retainer 124 is secured to the tube 12 by means of a plurality of circumferentially spaced fastening means in the nature of threaded cap screws which extend longitudinally through the retaining ring 124 into a section 151 of the front end of the tube which has an increased wall thickness. An annular subassembly generally designated by the numeral 34 provides sealing engagement between the piston rod 26 and the forward, inner end of the bearing 24 in a conventional manner.

At its forward end, piston rod 26 carries a button 36 secured by a screw 38 threaded into a hole at the end of the piston rod. Button 36 serves to bear against a machine part to be controlled by the shock absorber 10. A spiral spring 40 extends between the rear side of button 36 and the outer face of the end cap 128, thereby acting to return the piston rod 26 to its normal, extended position after the machine part is moved away from the shock absorber 10. A piston head 42 is formed integrally with the rear end of piston rod 26. A groove on the outer diameter of the piston head 42 carries a piston ring 44 bearing against the inner diameter of cylinder 22. The rear end of piston head 42 is formed with a central aperture 46 which communicates at its forward end with a central cavity 48. Cavity 48, in turn, communicates with a vertically extending bore 50 at the rear of the piston head 42. The concave surface between the larger aperture 46 and the smaller cavity 48 acts as a seat for a ball check valve 52. A valve retainer is provided rearwardly of the ball valve 52 by way of retainer ring 54. When the piston moves rearwardly under the influence of a force exerted on button 36 by a machine part, the cavity 48 is sealed by the ball 52, and when the piston moves in the forward direction under the force of return spring 40, a free flow path is established through the aperture 46, cavity 48 and bore 50.

Figure 2:
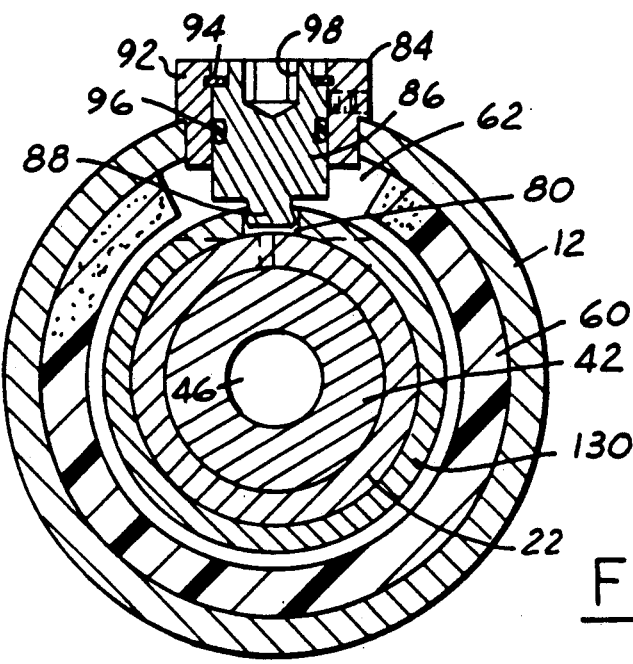
FIG. 2 is a sectional view taken along the line 2—2 in FIG. 1.

Bore 50 communicates with an opening 56 in the forward end of the cylinder 22. The opening 56, in turn, communicates with the annular volume 58 between the inner wall of tube 12 and the outer wall of cylinder 22. An accumulator pad 60 substantially fills the entire volume 58 and is secured against rotation therein by means of retainer pins 144 which extend through the tube 12 into the pad 60. The pad 60 is preferably formed of cellular rubber which may be filled with nitrogen provided with a high degree of resilience and, as shown in FIG. 2, is provided with a slot 62 therein allowing clearance for an adjustor mechanism and metering orifices which will be discussed below.

A plurality of straight-sided holes 106–116 are formed radially through the wall of cylinder 22. Holes 106–116 are in longitudinal alignment with each other, and their respective spacings are arranged at exponentially decreasing distances in the direction of the rear of the cylinder 22.

A metering sleeve 130 slidably surrounds the outer diameter of cylinder 22. The sleeve 130 is provided with a plurality of longitudinally spaced "cross-cut" openings or grooves 132–142 therein, along one side thereof. The cross-cut openings 132–142 are spaced at exponentially decreasing distances in the direction of the rear of the cylinder 22 and generally relate to and respectively coact with the holes 106–116 in the cylinder 22. Each of the grooves 132–142 is defined by a pair of spaced-apart, radially extending, parallel side walls 180, 182 and a flat bottom wall formed by first and second spaced-apart sections 184, 186. The bottom wall sections 184 and 186, along with the side walls 180 and 182 define a substantially rectangularly-shaped (when viewed in plan) metering orifice in the inner wall of the cylinder 22, the corresponding opening in the outer surface of the sleeve 130 being substantially arcuate in conformance with the cylindrical surface of the cylinder 130.

Figure 3:
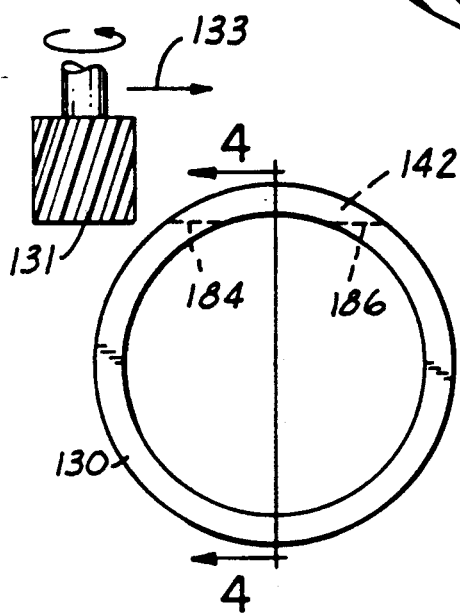
FIG. 3 is a view of one end of the metering sleeve employed in the shock absorber of FIG. 1 and depicting a method of forming cross-cut openings therein.
Figure 4:
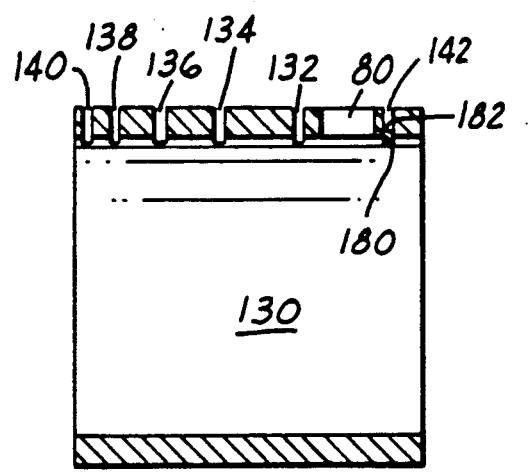
FIG. 4 is a sectional view taken along the line 4—4 in FIG. 3.
Figure 5:
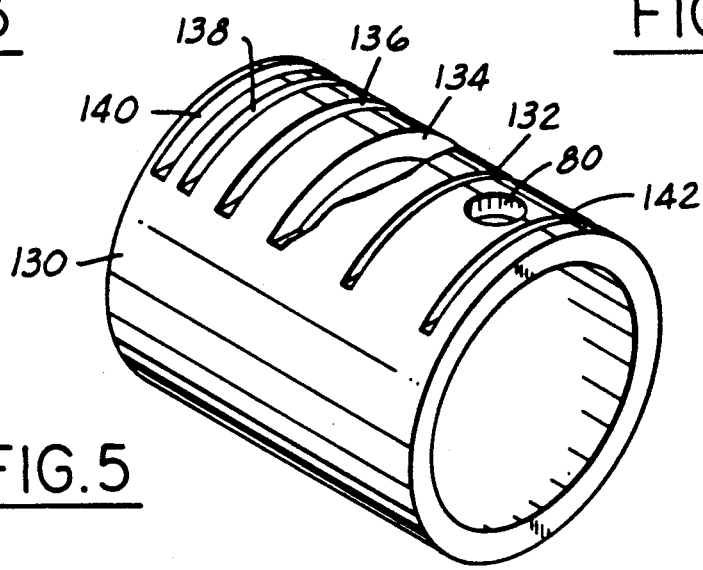
FIG. 5 is a perspective view of the sleeve of FIG. 3, a portion of the sleeve being broken away to better reveal one of the cross-cut openings.

Referring particularly to FIG. 3, the cross-cut openings 132–142 each may be formed by passing a cutting tool, such as the rotating milling head 131 along a straight path designated by the arrow 133 through one side of the sleeve 130, with the depth of the head 131 being sufficient to cut through the inner wall of the sleeve 130, and thereby form the orifice. As mentioned above, the single cut required to form each of the grooves 132–142 comprises a straight stroke, along a path extending perpendicular to a radial reference axis through the center of the cross cut. This reference axis, as best seen in FIG. 3, would lie along a line corresponding to the section line 4—4. The metering sleeve 130 further includes a relatively large diameter circular hole 80 positioned between the cross-cut grooves 132 and 142.

An adjuster mechanism, generally indicated at 84, is provided to vary the extent of overlap between the cross-cut grooves 132–142 and the cylinder holes 106–116. Adjuster mechanism 84 includes a stub shaft 86 having a spherical off-center cam portion 88 formed at its innermost end. Spherical cam portion is received within the circular hole 80 in the sleeve 130. Shaft 86 is mounted for rotation by way of surrounding collar 92 fixed to the outer tube 12. A retaining ring 94 lies within a circumferential groove in shaft 86, above cam 88, to restrict upward movement of the shaft. An O-ring 96 provides a fluid seal between shaft 86 and collar 92. A socket 98 is formed along the vertical center line of shaft 86 and is adapted to receive a suitably conforming wrench for rotating the shaft. The interior of the shock absorber device 10 is filled with non-compressible hydraulic fluid by way of port 82.

Figure 6:
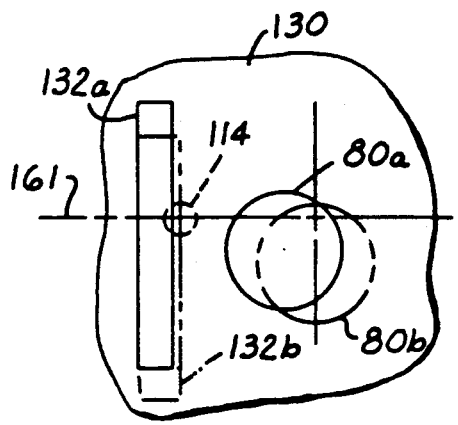
FIG. 6 is a fragmentary, plan view showing the relationship of an adjustment cam hole and one of the cross-cut openings in the one-fourth and the one-half metering positions.
Figure 7:
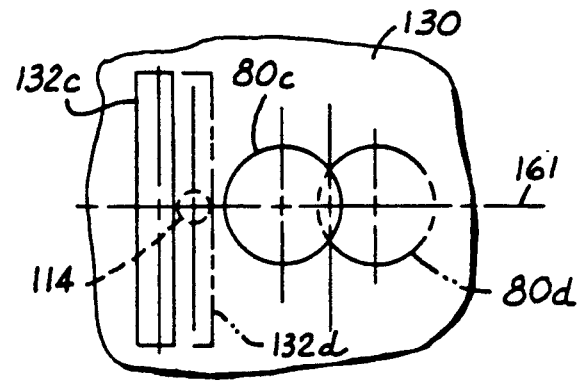
FIG. 7 is a view similar to FIG. 6, but depicting the off and full open positions.
Figure 8:
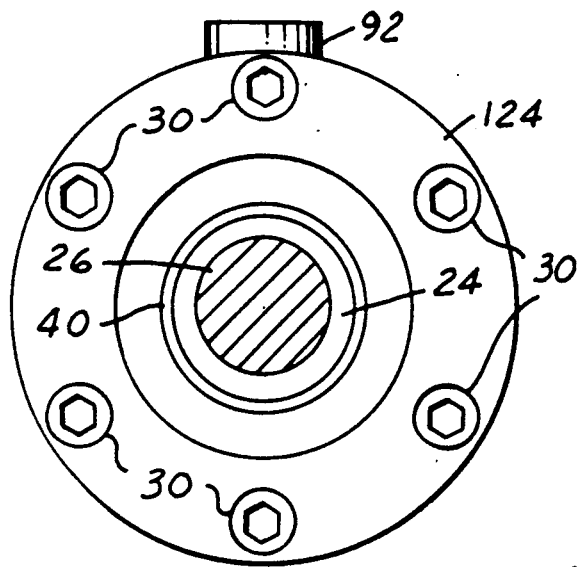
FIG. 8 is a sectional view taken along the line 8—8 in FIG. 1.
Figure 9:
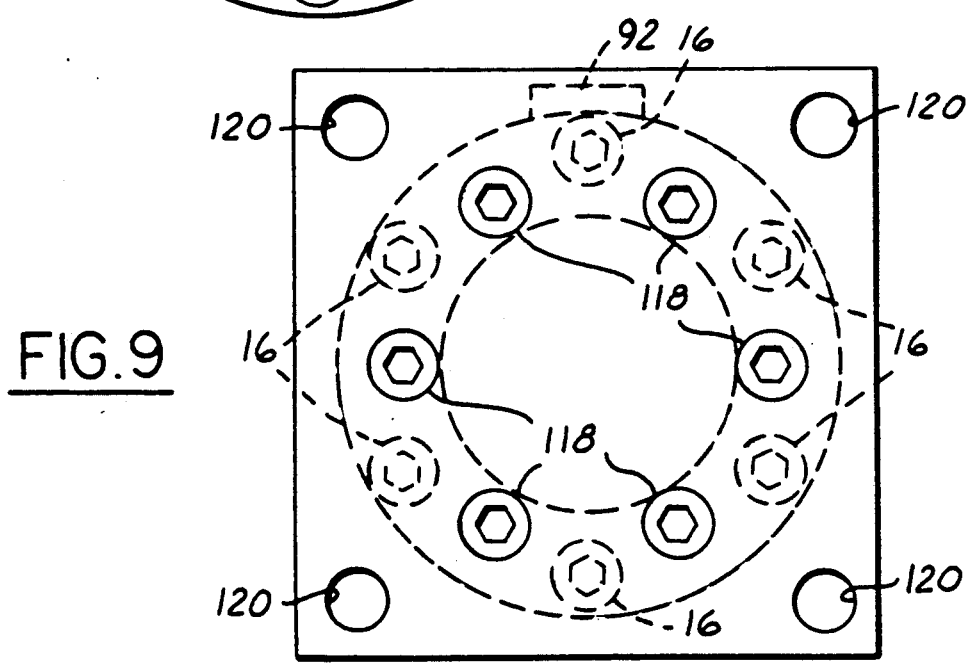
FIG. 9 a view of the rear end of the shock absorber device of FIG. 1.

Reference is now made particularly to FIGS. 6 and 7 which depict the alignment relationship between one of the metering openings 132 and the associated hole 114 in the cylinder 22, as a function of the position of the opening 80 controlled by the adjustor mechanism 84. Because of the eccentric nature of the cam 88 relative to the central axis of the stub shaft 86, rotation of the adjustor mechanism 84 causes the metering sleeve 130 to shift both longitudinally and circumferentially relative to the cylinder 22, in an orbital-like pattern. A central reference axis 161 is shown which extends through the center of the hole 114, metering opening 132 and hole 80, when the adjustor mechanism 84 is in either its off or full open position, as shown in FIG. 7. In FIG. 7, the off position is indicated in full lines and depicts the metering opening 132c being shifted to the left or rear end of the cylinder 22 so that there is no overlap or registration between the metering opening 132c and the hole 114. This position also corresponds to that depicted in FIG. 1. In the off position, since there is no overlap between the metering opening in the sleeve 130 and the holes in the cylinder 22, fluid is prevented from passing between the annular volume 58 and the interior of the cylinder 22. With the adjustor mechanism 84 in its full open position, the corresponding positions of the hole 80d, hole 114 and metering opening 132d are indicated in the phantom in FIG. 7. In the full open position, it can be seen that the hole 114 is in full registration with the metering opening 132d, and thus a maximum amount of fluid is allowed to pass from within the cylinder 22, which is at relatively high pressure, into the annular volume 62 which is at relatively low pressure.

When the adjustor mechanism 84 is in the one-fourth open position, the relative positions of the hole 80a, metering opening 132a and hole 114 are those shown in full line in FIG. 6. With the adjustor mechanism 84 in the half-open position, these same features are in the relative positions indicated in the phantom and designated by the numerals 80b, 114 and 132b. The orbital motion of the metering tube 130 relative to cylinder 22 can be appreciated from FIGS. 6 and 7; circumferential displacement of the metering tube 130 is evidenced by the two positions of the metering openings 132a, 132b, and longitudinal displacement is seen in both FIGS. 6 and 7.

From the foregoing, it can be appreciated that the shock absorber device described above as well as the method for making the metering sleeve not only provide for the reliable accomplishment of the objects of the invention, but do so in a particularly effective and economical manner. It is recognized, of course, that those skilled in the art may make various modifications or additions to the preferred embodiment chosen to illustrate the invention, without departing from the spirit and scope of the present contribution to the art. Accordingly, it is to be understood that the protection sought and to be afforded hereby should be deemed to extend to the subject matter claimed and all equivalents thereof fairly within the scope of the invention.

What is claimed is:

1. A shock-absorbing device suitable to be mounted on a structure and of the type employing hydraulic fluid for absorbing the kinetic energy of a moving member so as to decelerate the member, comprising:

a tubular cylinder having a plurality of longitudinally spaced holes therein through which said fluid may flow;

a piston slidable within said cylinder and adapted to be displaced by said member to force said hydraulic fluid through said holes;

a sleeve slidably surrounding said cylinder, said sleeve including a plurality of longitudinally spaced openings therein cooperable with said holes in said tubular cylinder to meter the amount of said hydraulic fluid flowing through said holes, each of said openings being defined by a cross-cut opening extending through a portion of the wall of said sleeve and transverse to the longitudinal axis of said sleeve;

adjustment means coupled with said sleeve for sliding said sleeve in an endless orbital path relative to said tubular cylinder so as to control the registration of said holes with said openings, said adjustment means being shiftable to any of a plurality of positions respectively representing choices of metering rates for said hydraulic fluid; and an outer tube surrounding and radially spaced from said tubular cylinder to define a volume within said device for containing said hydraulic fluid, a pair of end caps having end faces respectively closing opposite ends of said outer tube;

a pair of retainers respectfully bearing against the opposite ends of said outer tube and overlying said end caps, and threaded fastening means extending through said retainers into said outer tube;

a mounting plate for mounting said shock absorbing device on said structure;

means for releasably securing said mounting plate on one of said retainers, and said one retainer being ring-shaped and including a plurality of circumferentially spaced openings therein, one of said end faces being adjacent said one retainer and having a boss extending into an inner periphery of said one retainer; and said securing means including a plurality of threaded fasteners respectfully extending into said openings in said one retainer.

2. The shock-absorbing device of claim 1, wherein said sleeve is circular in cross-section and each of said cross-cut openings includes a portion defining a chord extending through a side of the circle formed by the circular cross-section of said sleeve.

3. The shock-absorbing device of claim 2, wherein each of said cross-cut openings includes first and second spaced-apart bottom wall portions lying in the same plane, and an orifice between said first and second bottom wall portions.

4. The shock-absorbing device of claim 3, wherein each of said cross-cut openings includes a pair of flat spaced-apart side walls perpendicular to said bottom wall portions.

5. The shock-absorbing device of claim 1, wherein each of said cross-cut openings includes a groove extending in a circumferential direction around only a portion of the outer surface of said sleeve.

6. The shock-absorbing device of claim 5, wherein each of said cross-cut openings further includes a pair of substantially parallel side walls defining said groove.

7. The shock-absorbing device of claim 6, wherein said each of said side walls lies in a plane substantially perpendicular to the longitudinal axis of said sleeve.

8. The shock-absorbing device of claim 1, wherein each of said cross-cut openings includes a substantially rectangular orifice through the inner surface of said sleeve.

9. The shock-absorbing device of claim 1, wherein said cross-cut openings are exponentially spaced apart along the longitudinal axis of said sleeve.

10. The shock-absorbing device of claim 1, wherein said securing means includes a plurality of elongate fastening members each extending parallel to the longitudinal axis of said tubular cylinder and into the end faces of said outer tube.

11. The shock-absorbing device of claim 10, wherein the opposite ends of said outer tube respectively include areas of increased radial thickness for receiving said fastening members.

12. A shock-absorbing device suitable to be mounted on a structure and of the type employing hydraulic fluid for absorbing the kinetic energy of a moving member, comprising:

an outer tube having opposite end faces;

a tubular cylinder within said outer tube and having a plurality of holes therein through which said fluid may flow;

a piston slidable within said tubular cylinder and adapted to be displaced by said member to force said hydraulic fluid through said holes;

a sleeve slidably surrounding said tubular cylinder and including a plurality of metering openings therein selectively registering with said holes in said tubular cylinder to allow said fluid to flow from said holes into an area of reduced pressure;

end walls having end faces respectively closing the opposite ends of said outer tube;

a pair of retainer members respectively bearing against the opposite end faces of said outer tube and respectively overlying said end walls;

threaded fastening means extending longitudinally through said retaining members into said outer tube;

a mounting plate for mounting said shock-absorbing device on said structure;

means for releasably securing said mounting plate on one of said retainer members, said one retainer member is ring-shaped and includes a plurality of circumferentially spaced openings therein, one of said end wall end faces being adjacent said one retainer member and having a base extending into an inner periphery of said done retainer; and said securing means including a plurality of threaded fasteners respectfully extending into said openings in said one retainer member.

13. The shock-absorbing device of claim 12, wherein said fastening means includes a plurality of threaded elongate fastening members, and the opposite ends of said outer tube include areas of increased radial thickness for receiving said fastening members.

14. The shock-absorbing device of claim 12, wherein said retainer members are each ring-shaped and said fastening means includes a plurality of threaded fastening members circumferentially spaced around and extending through said retainer members.

15. The shock-absorbing device of claim 12, wherein said tubular cylinder is secured to one of said end walls and engages the other one of said end walls, said fastening means directing force through said retainer members in opposite longitudinal directions against the opposite ends of said tubular cylinder, said force being sufficient to prevent rotation of said tubular cylinder and concomitant, unintended displacement of said holes relative to said metering openings.

16. The shock-absorbing device of claim 12, wherein said mounting plate includes a plurality of openings therein for permitting said plate to be secured to said structure.

* * * * *